(12) United States Patent
Santos Garcia

(10) Patent No.: US 9,198,025 B2
(45) Date of Patent: Nov. 24, 2015

(54) HIGH-CAPACITY SIM STORAGE CONTROL

(75) Inventor: Jose Carlos Santos Garcia, Madrid (ES)

(73) Assignee: SANDISK IL LTD., Kfar Saba (IL)

( * ) Notice: Subject to any disclaimer, the term of this patent is extended or adjusted under 35 U.S.C. 154(b) by 1165 days.

(21) Appl. No.: 11/698,833

(22) Filed: Jan. 29, 2007

(65) Prior Publication Data

US 2007/0259691 A1 Nov. 8, 2007

Related U.S. Application Data

(60) Provisional application No. 60/746,369, filed on May 4, 2006.

(51) Int. Cl.
| | |
|---|---|
| *H04M 3/00* | (2006.01) |
| *H04M 1/00* | (2006.01) |
| *H04B 1/38* | (2015.01) |
| *H04W 8/18* | (2009.01) |

(52) U.S. Cl.
CPC ..................................... *H04W 8/183* (2013.01)

(58) Field of Classification Search
CPC ............ H04W 8/245; H04M 1/72525; H04M 2250/14; H04B 1/3816
USPC .............. 455/411, 418–420, 556.1, 557–558, 455/550.1; 707/9
See application file for complete search history.

(56) References Cited

U.S. PATENT DOCUMENTS

| | | | |
|---|---|---|---|
| 6,011,976 A | 1/2000 | Michaels et al. | |
| 6,216,014 B1 * | 4/2001 | Proust et al. .................. | 455/558 |
| 6,480,935 B1 * | 11/2002 | Carper et al. ................. | 711/115 |
| 6,669,487 B1 * | 12/2003 | Ishihara et al. ................. | 439/60 |
| 7,114,051 B2 * | 9/2006 | Guu et al. ...................... | 711/173 |
| 2003/0228866 A1 * | 12/2003 | Pezeshki ..................... | 455/422.1 |
| 2004/0027979 A1 * | 2/2004 | Kawashima et al. ......... | 369/272 |
| 2005/0278787 A1 * | 12/2005 | Naslund et al. ................. | 726/26 |
| 2006/0066903 A1 * | 3/2006 | Shiimori ...................... | 358/1.16 |
| 2006/0242066 A1 * | 10/2006 | Jogand-Coulomb et al. ... | 705/50 |
| 2006/0265425 A1 * | 11/2006 | Raff et al. ..................... | 707/200 |
| 2007/0112680 A1 * | 5/2007 | van Niekerk et al. .......... | 705/57 |

FOREIGN PATENT DOCUMENTS

| | | |
|---|---|---|
| EP | 1837790 | 9/2007 |
| GB | 2389272 | 12/2003 |
| WO | WO 03088054 A1 * | 10/2003 |

OTHER PUBLICATIONS

U.S. Appl. No. 11/636,540, filed Dec. 2006, Agami and Mardkis.
International Search Report and Written Opinion received in corresponding PCT Application No. PCT/IL2007/000530 from the International Searching Authority (EPO) mailed Mar. 18, 2008, 13 pages.

* cited by examiner

*Primary Examiner* — Dung Hong
(74) *Attorney, Agent, or Firm* — Toler Law Group, PC

(57) ABSTRACT

A high-capacity SIM card includes: memory having at least one partition and a memory controller configured: to control at least two modes of access to one partition of the partitions, only one of the modes being a currently-active mode; and to allow the currently-active mode to be operationally changed remotely. Preferably, the memory controller controls operability of reading data, writing data, erasing data, and/or executing code, according to the currently-active mode. Preferably, the memory controller also controls storage of data in the card based on access-control data delivered to the card. Preferably, the memory controller is configured to reversibly operationally change, for one partition, which mode is the currently-active mode. Preferably, the memory controller prohibits change of the currently-active mode by a host device of the card.

20 Claims, 4 Drawing Sheets

HIGH-CAPACITY SIM STORAGE CONTROL

This patent application claims the benefit of U.S. Provisional Patent Application No. 60/746,369 filed May 4, 2006.

FIELD AND BACKGROUND OF THE INVENTION

The present invention relates to systems and methods for a mobile network operator (MNO) to dynamically control the usage of memory within a high-capacity subscriber identity module (SIM) card.

Mobile phones are typically installed with a SIM card provided to mobile phone subscribers by the MNO. The SIM card is used to uniquely identify the mobile phone subscriber, with a specific SIM card corresponding to a specific mobile phone number. In addition to the SIM identification function, the SIM card provides the mobile phone with additional services such as memory storage for a limited-size phonebook, memory storage for SMS (i.e. short-message service) messages, and encryption services. The benefit of storing information on the SIM card is that when a subscriber changes devices (i.e. mobile phones), whether in the context of upgrading to a new model or due to a device problem, the SIM card can be transferred from the old device to the new device, making all the information stored in the SIM available on the new device.

Recent developments have further enhanced the SIM card by creating a high-capacity SIM card, which is a SIM card with a large amount of memory storage. Typically, a high-capacity SIM card is capable of storing from 64 MB to 1 GB of data, in comparison to a legacy SIM card capable of storing from 64 KB to 256 KB of data. An example of such a product is the MegaSIM™ card available from msystems Ltd., Kefar Saba, Israel.

The cost of a high-capacity SIM card is higher than the cost of a legacy SIM card, and depends on the amount of memory provided within the high-capacity SIM card. A high-capacity SIM card is typically offered as an alternative component to a mobile phone with a legacy SIM card and a separate memory card slot.

In many cases, an MNO subsidizes the cost of the mobile phone that is delivered to customers, and recovers this cost by selling mobile network services. If the MNO provides a high-capacity SIM card to clients, the additional cost may also be offset in a similar manner. However, current state-of-the-art technology does not enable an MNO to control the usage of the memory storage area of a high-capacity SIM card.

The control of a memory card by a SIM card is disclosed in Agami and Mardiks, U.S. patent application Ser. No. 11/636,540 filed Dec. 11, 2006, which is assigned to the assignee of the present invention, and is hereby incorporated by reference as if fully set forth herein. While serving some of the purposes of the present invention, the invention of the cited application fails to cover the situation in which the memory card is an integrated part of the SIM card. The prior-art patent application cited describes a system comprising a regular SIM card and a memory card. In such a system, the host device is required to be an intermediary, since there is no direct connection between the SIM card and the memory card. That is, the prior-art application cited above does not offer a stand-alone solution for segmented allocation of memory-storage partitions, independent of the host device software. The present invention relates to a device in which there is a direct connection between the SIM-card function and the storage device.

It would be desirable for an MNO to have means for remotely controlling the usage of memory on a high-capacity SIM card by a user, independent of the host device software.

SUMMARY OF THE INVENTION

It is the purpose of the present invention to provide systems and methods for an MNO to dynamically control the usage of memory within a high-capacity SIM card.

For the purpose of clarity, several terms which follow are specifically defined for use within this application. The term "SIM card" is used in this application to refer to a smart card that securely stores the identification information of a mobile phone subscriber. In addition, a SIM card typically contains memory for text messages and a phonebook. For simplicity, the term "SIM card" is used throughout this application to cover a family of smart cards that include: private SIM (subscriber identity module) cards, UMTS (Universal Mobile Telecommunications System) SIM cards (also called USIM cards), or RUIM (removable-user identity module) cards.

The term "high-capacity SIM card" is used in this application to refer to a SIM card that, in addition to the legacy SIM card functionality described above, contains a large (i.e. >256 KB, preferably >64 MB) amount of memory storage (e.g. flash memory) that is typically used for storing image and music files. A high-capacity SIM card usually has a high-speed interface, such as an SD™ (Secure Digital™) or MMC (multi-media card) interface, for accessing the mass storage. The term "partition" is used in this application to refer to a section of the memory. For example, a section of the memory can be viewed by a host device as a logical device, a directory entry of the file system, or any similar method of assigning part of the memory for specific usage. A physical storage device can be divided into several partitions. Each partition behaves like an independent storage area, for example, as a separate logical memory device. The term "mobile network operator" and "MNO" are used in this application to refer to an authority that operates a mobile phone network and infrastructure.

According to present invention, an MNO can define a number of partitions in the high-capacity SIM card, wherein each partition has a partition usage profile. The partition usage profile is a collection of attributes that specify the operations that the user is allowed to perform in the partition (such as read data, write data, or execute programs, for example). The partition usage profile might also include a time attribute that defines the expiration date of a given partition usage profile. One innovative aspect of the present invention is in enabling an MNO to change a partition usage profile, by controlling a SIM card remotely, by sending a "profile change command" over a mobile network.

Therefore, according to the present invention, there is provided for the first time a high-capacity SIM card including: (a) a memory including at least one partition; and (b) a memory controller configured: (i) to control at least two modes of access to one partition of the partitions, only one of the modes being a currently-active mode; and (ii) to allow the currently-active mode to be operationally changed remotely.

Preferably, the memory controller is configured to control operability of at least one operation selected from the group consisting of: reading data, writing data, erasing data, and executing code. The operability of the operation(s) is controlled according to the currently-active mode.

Preferably, the memory controller is configured to set the currently-active mode, via an instruction from an MNO, prior to activation of the card in a host device.

Preferably, the memory controller is configured to set the currently-active mode, via an instruction from an MNO, subsequent to activation of the card in a host device.

Preferably, the memory controller is also configured to control storage of data in the card based on access-control data delivered to the card.

Preferably, the memory controller is configured to reversibly operationally change, for one partition, which mode is the currently-active mode.

Preferably, the memory controller is configured to prohibit change of the currently-active mode by a host device of the card.

Preferably, the memory controller is configured to store the currently-active mode of one partition in said memory.

According to the present invention, there is provided for the first time a method for controlling access to memory of a high-capacity SIM card, the method including the steps of: (a) remotely assigning a currently-active mode from among at least two modes of access, to a partition residing in the card; (b) receiving a request from an application, running on a host device, to access the partition; and (c) allowing the application access to the partition according to the request, contingent upon whether the access is permitted according to the currently-active mode.

Preferably, the step of remotely assigning is performed by an MNO prior to activation of the card in the host device.

Preferably, the step of remotely assigning is performed by an MNO subsequent to activation of the card in the host device.

Preferably, the step of allowing the application access includes controlling operability of at least one operation selected from the group consisting of: reading data, writing data, erasing data, and executing code. The operability of the operation(s) is controlled according to the currently-active mode.

Preferably, the step of allowing the application access includes controlling storage of data in the card.

Most preferably, the controlling is based on access-control data delivered to the card.

Preferably, the method further includes the step of: (d) prohibiting change of the currently-active mode by the host device.

Preferably, the step of remotely assigning includes storing the currently-active mode for the partition in the memory.

These and further embodiments will be apparent from the detailed description and examples that follow.

BRIEF DESCRIPTION OF THE DRAWINGS

The present invention is herein described, by way of example only, with reference to the accompanying drawings, wherein.

DESCRIPTION OF THE PREFERRED EMBODIMENTS

The present invention relates to systems and methods for an MNO to dynamically control the usage of memory within a high-capacity SIM card. The principles and operation for an MNO to dynamically control the usage of memory within a high-capacity SIM card, according to the present invention, may be better understood with reference to the accompanying description and the drawings.

Figure 1:
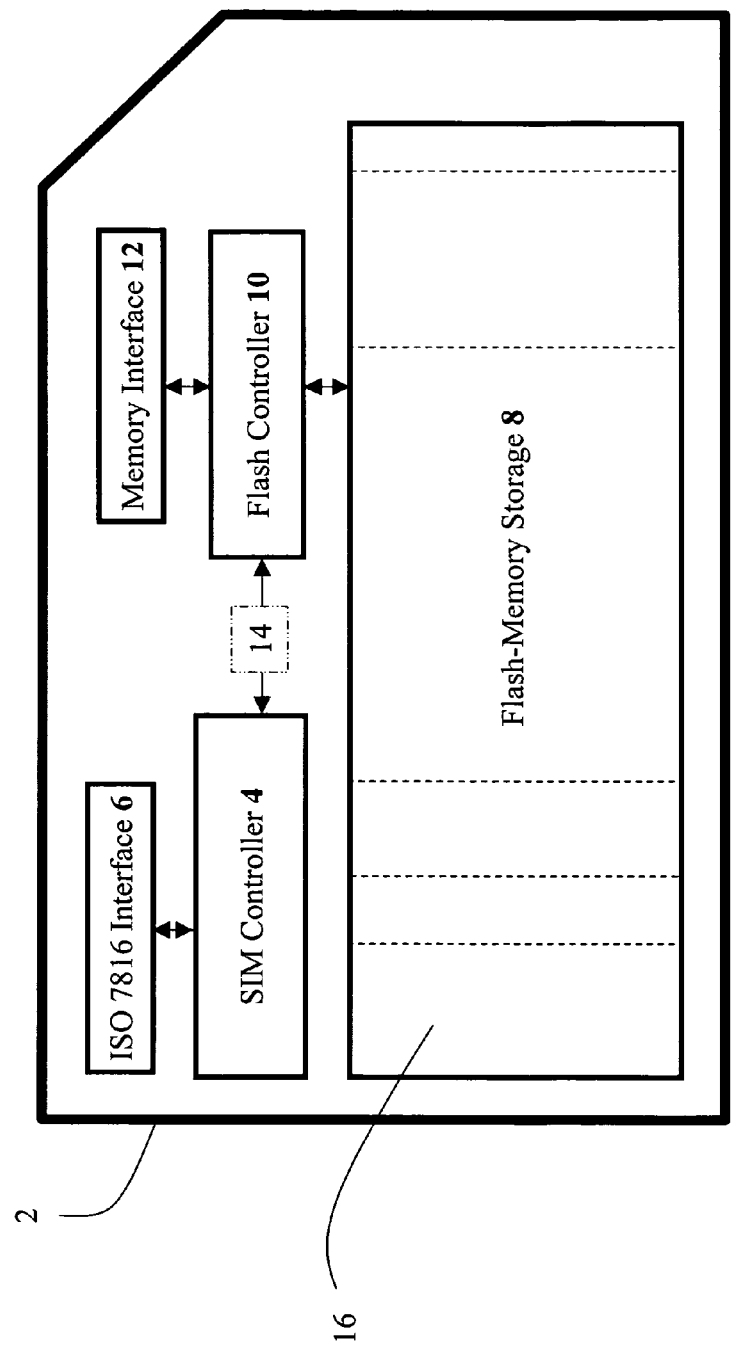
FIG. 1 is a simplified schematic block diagram of the architecture of a typical, high-capacity SIM card, both according to the prior art and according to the present invention.

Referring now to the drawings, FIG. 1 is a simplified block diagram of the architecture of a typical high-capacity SIM card, both according to the prior art and according to the present invention. A high-capacity SIM card 2 is shown having a SIM controller 4 responsible for legacy SIM functionalities. High-capacity SIM card 2 communicates with the host mobile phone (not shown) that SIM card 2 resides in using a standard SIM ISO 7816 interface 6. A flash-memory storage 8 provides high-capacity SIM card 2 with mass storage capabilities. Flash-memory storage 8 is controlled by a flash controller 10. Via flash controller 10, flash-memory storage 8 appears as a sector-based storage device (like a typical hard disk) to an application (not shown), and can be accessed either by an external application (via a memory interface 12), or internally (by SIM controller 4).

Memory interface 12 enables high-speed access to flash-memory storage 8 compared to the relatively low speed of ISO 7816 interface 6. Memory interface 12 is typically an MMC™ or SD™ interface, for example. Communication channel 14 is an internal interface that enables SIM controller 4 to access flash-memory storage 8. Communication channel 14 also provides the ability to supervise the data written to flash-memory storage 8 via memory interface 12.

Flash-memory storage 8 is shown divided into partitions 16. Each partition 16 appears as a separate logical device to an application or operating system running on the mobile phone. As depicted in FIG. 1, partitions 16 may be of different sizes. The number of partitions and the size of each partition are determined during a device-formatting operation which is performed according to MNO specifications. An MNO may also specify that preloaded content be placed on a partition. It is noted that a memory that is not partitioned at all is considered to have a single partition. To clarify the differentiation with the prior art, the present invention is an innovative way for an MNO to control a user's usage of the prior-art SIM card of FIG. 1.

Figure 2:
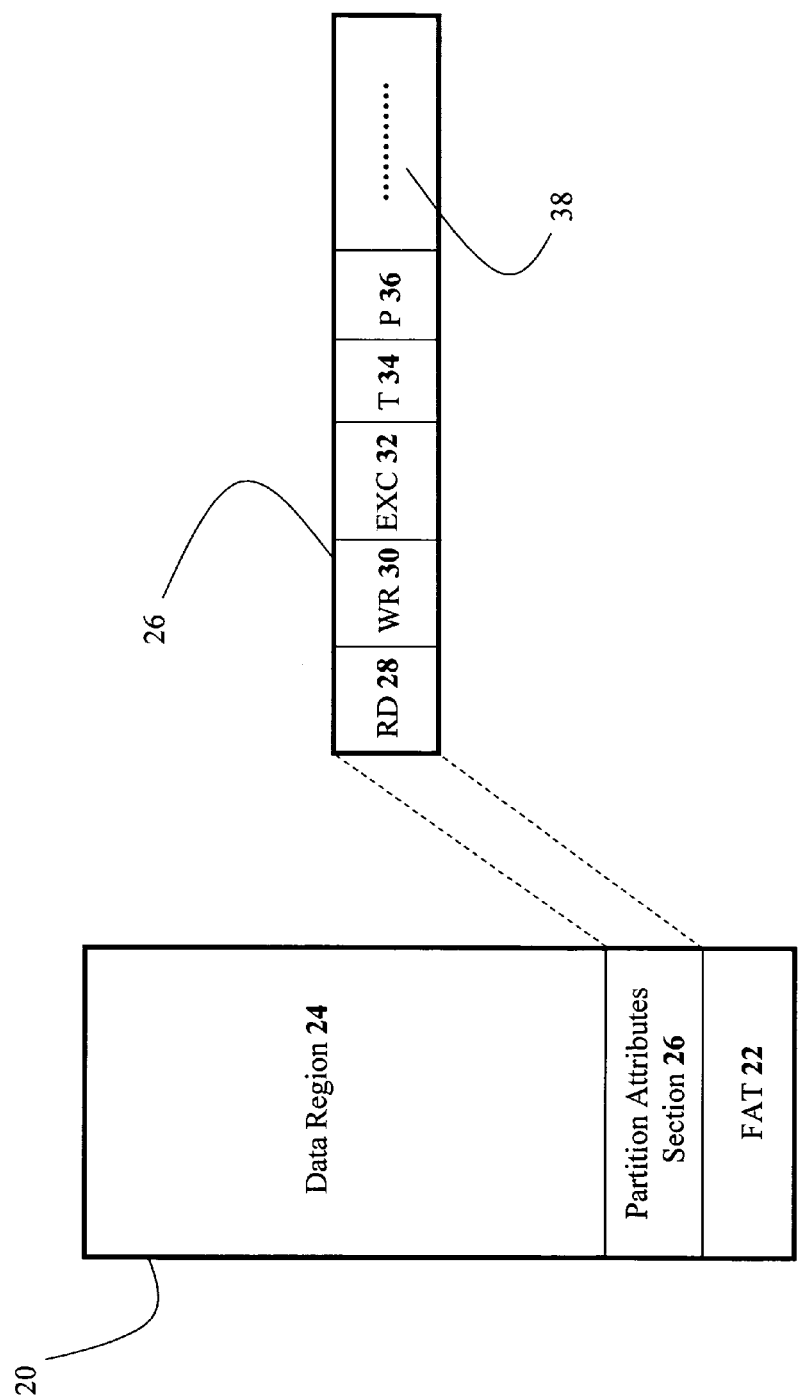
FIG. 2 shows the structure of a single partition and the storage area of the partition's attributes, according to a preferred embodiment of the present invention.

FIG. 2 shows the structure of a single partition and the storage area of the partition's attributes, according to a preferred embodiment of the present invention. A single partition 20 is shown having a file allocation table (FAT) 22 that specifies the mapping between the partition's logical-sector addresses and physical storage-device addresses. A data region 24 is used to store data, with a small portion of data region 24 reserved for partition attributes 26 of partition 20. Partition attributes section 26 includes: an RD field 28, for storing a read attribute that specifies the read authorizations for partition 20; a WR field 30, for storing a write attribute that sets the write authorizations for partition 20; an EXC field 32, for storing an execution attribute that designates the application-execution authorizations for partition 20; a T field 34, for storing a timing attribute that contains timing information (e.g. partition 20 can be set to become automatically enabled or disabled at a certain time and date); and a P field 36, for storing a protection attribute that contains security-related information (e.g. whether partition 20 is encrypted and with what encryption scheme). Spare attribute fields 38 are available for adding part of an "off-the-shelf" product (e.g. application-specific data-tags for determining access rights) or may be used to store MNO-specific attributes, for example.

Partition attributes section 26 is controlled by an MNO. The MNO designates the default settings for the attributes for the high-capacity SIM card manufacturer. The MNO can later change the settings for the attributes for partition 20 (and each additional partition) either by connecting the associated high-capacity SIM card to a settings-management system (e.g. a personal computer) via an adaptor, and running a high-capacity SIM configuration application. Alternatively, the MNO can change the settings for the attributes via the mobile network when the high-capacity SIM card is installed in the subscriber's mobile phone. The latter approach takes advantage of communication channel 14 between SIM controller 4 and flash controller 10 (shown in FIG. 1).

Figure 3:
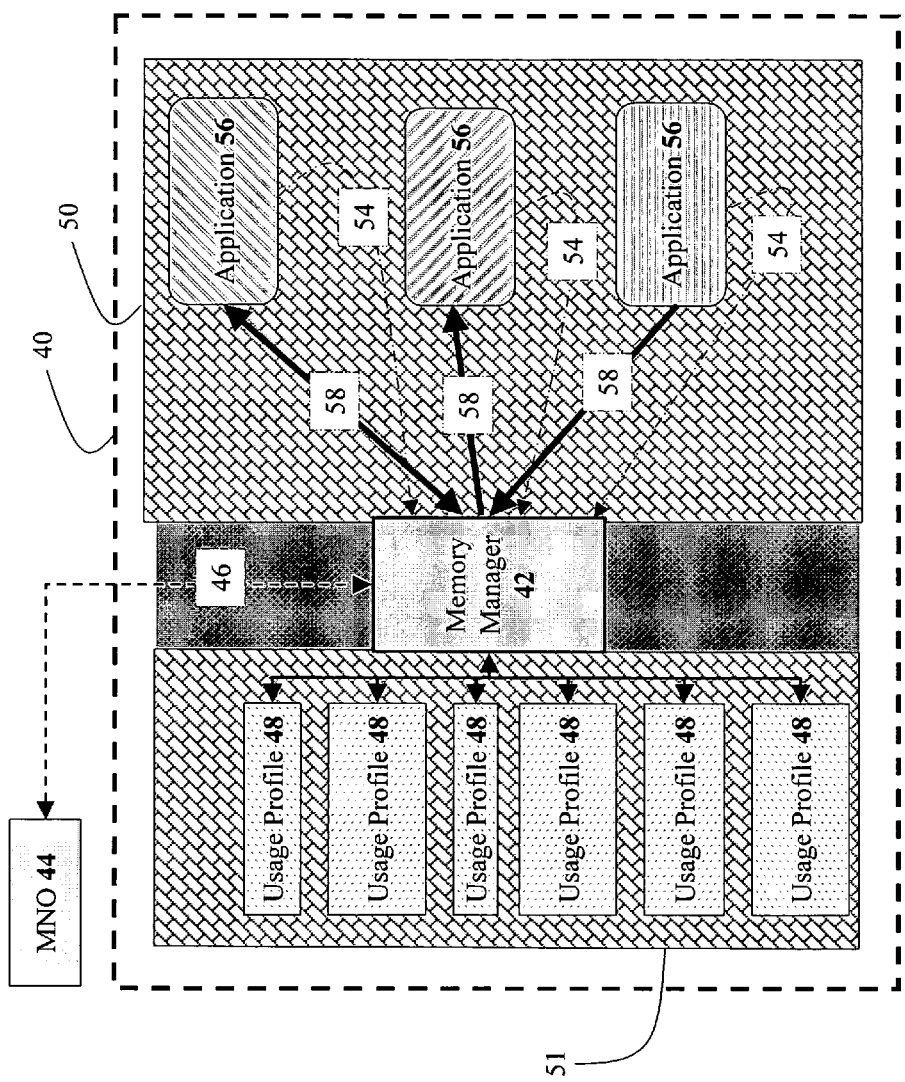
FIG. 3 shows a high-level logical view of an implementation of a storage control method, according to a preferred embodiment of the present invention.

FIG. 3 shows a high-level logical view of an implementation of a storage control method, according to a preferred embodiment of the present invention. A high-capacity SIM 40 containing a memory manager 42 is responsible for all memory-related activities. Memory manager 42 is an application executed by flash controller 10 of FIG. 1. Memory manager 42 is in communication with an MNO 44, via a wireless network connection 46 used by MNO 44 for changing partition usage profiles 48. Memory manager 42 controls access to a storage memory 50 according to partition usage profiles 48 for each partition. Storage memory 50 includes data region 24 of FIG. 2. Each usage profile 48 defines two or more operating modes of a given partition for determining the access rights of each partition 20. At any given time, only one operating mode is active. Partition usage profiles 48 are stored in a restricted-access region 51 of storage memory 50, and can be changed only by an authorized entity (e.g. MNO 44). The grey region between restricted-access region 51 and storage memory 50 is meant to indicate that access to restricted-access region 51 is restricted, and that access to storage memory 50 is regulated by memory manager 42. Each partition usage profile 48 in FIG. 3 corresponds to a partition attributes section 26 of one partition 20 as shown in FIG. 2. By changing the operating mode, access rights to the partitions are changed accordingly. The active operating mode is stored by setting RD field 28, WR field 30, and EXC field 32 (e.g. for single-bit fields, "read/write enabled" can be RD=1, WR=1, EXC=0; "read/write/execute disabled" can be RD=0, WR=0, EXC=0).

Figure 4:
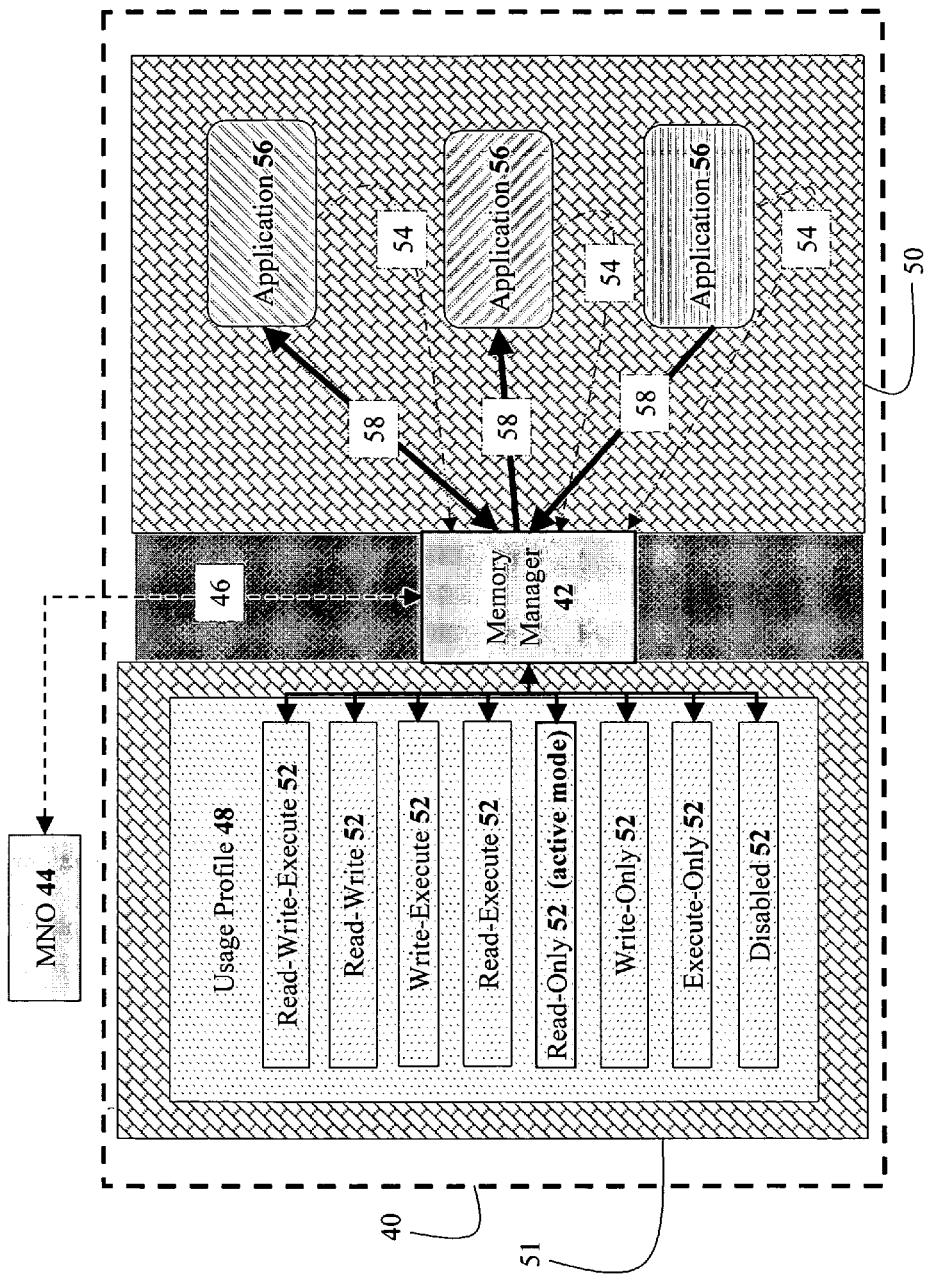
FIG. 4 shows a high-level logical view of the control of access to data, determined by which access mode is active, by a single usage profile in the implementation of FIG. 3.

FIG. 4 shows a high-level logical view of the control of access to data, determined by which access mode is active, by a single usage profile (i.e. a given partition usage profile 48 of partition 20) in the implementation of FIG. 3. Within a given partition usage profile 48, an access mode 52 is enabled by MNO 44. Memory manager 42 allows or rejects various access requests 54 (e.g. read, write, and execute) received from applications 56 according to which access mode 54 that MNO 44 has enabled. For example, if MNO 44 has set usage profile 48 to "read-only" mode (as shown in FIG. 4), then applications 56 are allowed to read the associated partition 20 in storage memory 50, but are not allowed to write to partition 20 or execute partition 20. Based on access requests 54, various data channels 58 (e.g. unidirectional or bidirectional) become operative to applications 56.

It is noted that for any given partition usage profile 48, only one access mode 52 will be active. Thus, partition usage profile 48 is illustrated logically as a table of possible access modes 52 in FIG. 4, with only one of access modes 52 being selected by MNO 44 at any given time. For illustrative purposes, the read-only mode in FIG. 4 is shown as the active mode.

It should be noted that the host device, typically a mobile phone, is not involved in the process of controlling the partitions, thus, there is no need to install any software, or to run any application in the host device for this purpose. This makes the method of the present invention independent of the functional components that are not controlled by the MNO. It should also be noted that memory manager 42 can use part of the data transmitted to the host device to make the access-mode "control decision" (i.e. to modify the active access-mode setting based on such data) besides the pre-determined setting of the MNO. Since all data flowing into and out of storage memory 50 flows through the high-capacity SIM interface via communication channel 14, the control logic (i.e. of access modes 52 by partition usage profile 48 via memory manager 42), which is set by MNO 44, can make use of the data in the control decision.

For example, the high-capacity SIM interface can prevent the host device from storing data that contains specific data sequences. Such data sequences could be, for example, coded tags indicating proprietary or copyrighted material (i.e. media). Using digital rights-management (DRM) tools, MNO 44 optionally prevents illegal copies of such material from being downloaded to the host device by sending access-control data to memory manager 42, and provide the user with the option of acquiring the DRM usage rights. Such DRM tools, as well as a table of the restricted data-tag sequences, could be stored locally in restricted-access region 51 (e.g. in spare attribute fields 38 of partition attributes section 26 of FIG. 2). Such sequence tables could be updatable only by MNO 44, or could be managed directly by MNO 44. Management of such sequence tables by MNO 44 could include, for example, updating sequences in the tables from content providers that require such sequences being resident in a device subscribed to a service in which each item is checked for DRM authorization.

While the invention has been described with respect to a limited number of embodiments, it will be appreciated that many variations, modifications, and other applications of the invention may be made.

What is claimed is:

1. A subscriber identity module (SIM) card comprising:
   a memory having a plurality of partitions; and
   a memory controller configured to:
   receive access-control data from a remote source via a host device, wherein the remote source is distinct from the host device;
   set, based on the access-control data, an active access mode associated with a first partition of the plurality of partitions;
   receive a request to access the first partition from an application of the host device;
   determine, independent of the application that sent the request, whether to permit
   or prevent the access based on the active access mode; and
   prevent the host device from storing particular data in the memory upon detecting that the particular data includes a particular data sequence that matches a data sequence that includes one or more tags of digital rights management (DRM) information.

2. The SIM card of claim 1, wherein the memory and the memory controller are operationally coupled to the host device, and wherein the memory controller is further configured to prohibit the active access mode from being changed based on a request initiated by the host device.

3. The SIM card of claim 1, wherein the plurality of partitions is specified by a mobile network operator, wherein default settings of partition attributes associated with the first partition are designated by the mobile network operator and stored in a reserved portion of the first partition, wherein the mobile network operator is associated with the remote source, and wherein the memory controller is configured to only change one or more access modes of the plurality of partitions based on profile change commands received from the mobile network operator.

4. The SIM card of claim 1, wherein a data region within the first partition includes a reserved portion for storing partition attributes that are associated with the first partition.

5. The SIM card of claim 1, wherein the memory controller is further configured to:
   control at least two modes of access to the first partition, wherein only one of the at least two modes is the active access mode at a particular time, the at least two modes including a first access mode and a second access mode; and
   control storage of data in the memory and limit access to the data based on the access-control data delivered to the memory.

6. The SIM card of claim 1, wherein presence of the one or more tags in the particular data received from the host device indicates that the particular data received from the host device is at least one of proprietary or copyrighted.

7. The SIM card of claim 1, wherein the first partition includes a data region and a file allocation table, wherein the data region includes a reserved portion that stores partition attributes of the first partition, wherein the partition attributes include a time attribute that identifies a time period when the first partition is enabled or disabled, wherein the partition attributes include a protection attribute that indicates whether the first partition is encrypted, and wherein the file allocation table identifies address mapping between logical addresses of the first partition and physical addresses.

8. The SIM card of claim 1, wherein the first partition includes a first access profile and a second access profile, wherein the first access profile includes a first set of partition attributes corresponding to the active access mode of the first partition, and wherein the second access profile includes a second set of partition attributes corresponding to a second access mode.

9. The SIM card of claim 8, wherein the access-control data is included in a profile change command received at the memory controller from the remote source via the host device, and wherein the memory controller is configured to, based on the profile change command:
   change the second set of partition attributes, wherein the second set of partition attributes is changed by setting a time parameter based on a value included in the profile change command; and
   set the active access mode as the second access mode, wherein the second access mode corresponds to the changed second set of partition attributes.

10. A method of controlling access to a memory of a subscriber identity module (SIM) card, the method comprising:
   at a SIM card having a memory controller and a memory with a plurality of partitions, performing the following:
      set, based on access-control data received from a remote source via a host device, an active access mode associated with a first partition of the plurality of partitions, wherein the remote source is distinct from the host device;
      control storage of data in the SIM card and control access to the data based on the access mode; and
      prevent the host device from storing particular data in the memory when the particular data includes a particular data sequence of one or more data sequences that includes one or more tags of digital rights management (DRM) information.

11. The method of claim 10, further comprising, at the SIM card, performing the following:
   receive the access-control data from the remote source, wherein the access-control data includes the one or more data sequences provided by a mobile network operator; and
   store the one or more data sequences in the memory for comparison with the particular data received from the host device, wherein the one or more data sequences correspond to specific data sequences that indicate that the data received from the host device is prevented from being used with the active mode.

12. The method of claim 11, wherein presence of the one or more tags in the particular data received from the host device indicates that the particular data received from the host device is at least one of proprietary or copyrighted.

13. The method of claim 10, wherein the one or more data sequences is stored in a reserved portion of a data region of the first partition.

14. The method of claim 10, wherein the active access mode is set as one of a plurality of modes, and wherein only one mode of the plurality modes is set as the active mode at a particular time.

15. The method of claim 10, wherein the one or more data sequences is stored in a restricted portion of the memory.

16. The method of claim 10, further comprising, at the SIM card, performing the following:
   receiving a request to access the first partition from an application of the host device; and
   determining, independent of the application that sent the request, whether to permit or prevent the access based on the access mode.

17. A subscriber identity module (SIM) card comprising:
   a memory having at least one partition; and
   a memory controller configured to:
      control at least two modes of access to the at least one partition, wherein only one of the at least two modes is an active mode;
      allow the active mode to be changed in response to a command from a remote source; and
      control storage of data in the memory and limit access to the data based on access-control data delivered to the memory;
   wherein a data region within the at least one partition includes a reserved portion for storing partition attributes associated with the at least one partition; and
   wherein the memory controller is further configured to prevent a host device from storing the data in the memory when the data includes one of a plurality of data sequences that includes one or more tags of digital rights management (DRM) information.

18. The SIM card of claim 17, wherein a table of the plurality of data sequences is stored in attribute fields of the reserved portion.

19. A subscriber identity module (SIM) card comprising:
   a memory having a plurality of partitions; and
   a memory controller configured to:
      receive access-control data from a remote source via a host device, wherein the remote source is distinct from the host device;
      change, based on the access-control data, an access mode associated with a first partition of the plurality of partitions from a first access mode to a second access mode, wherein the first access mode is set as one of a plurality of modes, and wherein only one mode of the plurality of modes is set as an active mode at a particular time;

receive a request to access the first partition from an application of the host device;

determine, independent of the application that sent the request, whether to permit or prevent the access based on the access mode; and prevent the host device from storing particular data in the memory upon detecting that the particular data includes a particular data sequence that matches a data sequence that includes one or more tags of digital rights management (DRM) information.

20. The SIM card of claim 19, wherein the memory and the memory controller are operationally coupled to the host device, and wherein the memory controller is further configured to prohibit the access mode from being changed based on a request initiated by the host device.

* * * * *